United States Patent [19]

Rosman et al.

[11] Patent Number: 4,589,176
[45] Date of Patent: May 20, 1986

[54] FIBER-COMPOSITE TURBINE BLADE AND METHOD FOR ITS CONSTRUCTION

[75] Inventors: Irwin E. Rosman; Jerhong Lin, both of Woodland Hills, Calif.

[73] Assignee: Rockwell International Corporation, El Segundo, Calif.

[21] Appl. No.: 555,302

[22] Filed: Nov. 25, 1983

[51] Int. Cl.⁴ .................... B21K 3/04; B27B 15/04
[52] U.S. Cl. .................... 29/156.8 B; 29/156.8 R; 29/419 R; 29/527.1; 29/530; 29/DIG. 29; 29/DIG. 31; 416/230; 416/241 R; 416/229 A; 419/8; 419/24
[58] Field of Search .................... 29/156.8 B, 156.8 H, 29/156.8 R, 419 R, 527.1, 530, DIG. 29, DIG. 31; 416/230, 241 R, 241 A, 241 B, 229 A; 419/8, 24

[56] References Cited

U.S. PATENT DOCUMENTS

| | | | |
|---|---|---|---|
| 3,255,280 | 6/1966 | Burrowes | 29/419 R UX |
| 3,632,460 | 1/1972 | Palfreyman | 416/230 X |
| 3,679,324 | 7/1972 | Stargardter | 416/230 X |
| 3,942,231 | 3/1976 | Whitaker | 29/156.8 B |
| 4,040,770 | 8/1977 | Carlson | 416/230 |
| 4,111,606 | 9/1978 | Prewo | 416/230 R X |
| 4,339,229 | 7/1982 | Rossman | 416/230 X |
| 4,363,602 | 12/1982 | Martin | 416/230 |

OTHER PUBLICATIONS

Winsa, E. A. *NASA Technical Memorandum* 82811, "Tungsten Fiber Reinforced Superalloy Composite High Temperature Component Design Consideration", Lewis Research Ctr., Cleveland, Ohio, Feb. 1982.

*Primary Examiner*—Mark Rosenbaum
*Assistant Examiner*—Ronald S. Wallace
*Attorney, Agent, or Firm*—H. Fredrick Hamann; Harry B. Field; Lawrence N. Ginsberg

[57] ABSTRACT

The present invention provides a method for constructing from fiber-composite material complex structures having two or more transversely disposed members. By way of example, a composite turbine blade 10 having an aerofoil 12 and an integrally formed footing 14 can be constructed using this new method, which method comprises the steps of forming from fiber-composite monotape a blank 40 in the general shape of aerofoil 12 with the fibers 18′ of the monotape being oriented in a generally spanwise direction, exposing the fibers 18′ at the root 42 of the aerofoil blank 40, inserting transversely between the exposed fibers 18′ a plurality of foot-forming monotapes 17 to form a transversely meshed, tape and fiber structure 68, filling the voids in the transversely meshed structure with powdered matrix material and hot-pressing the filled-in structure 70 substantially according to the desired final shape of the fiber-composite turbine blade.

9 Claims, 18 Drawing Figures

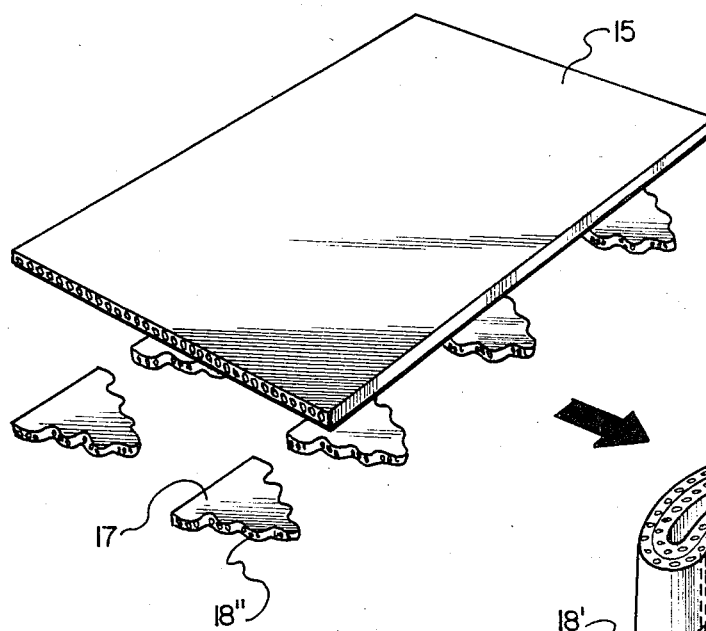
Fig.1.(A)
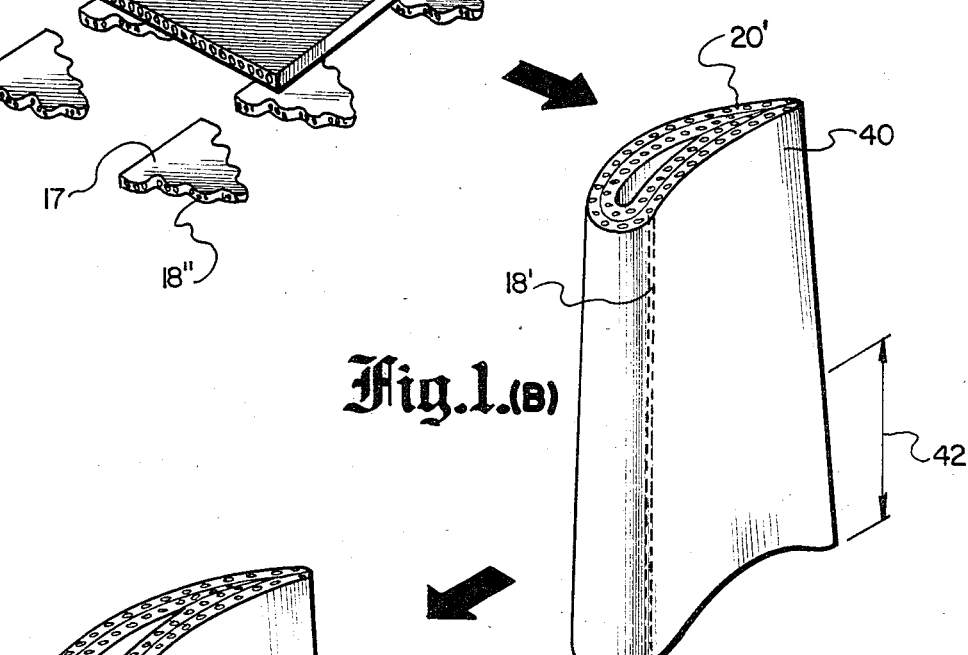
Fig.1.(B)
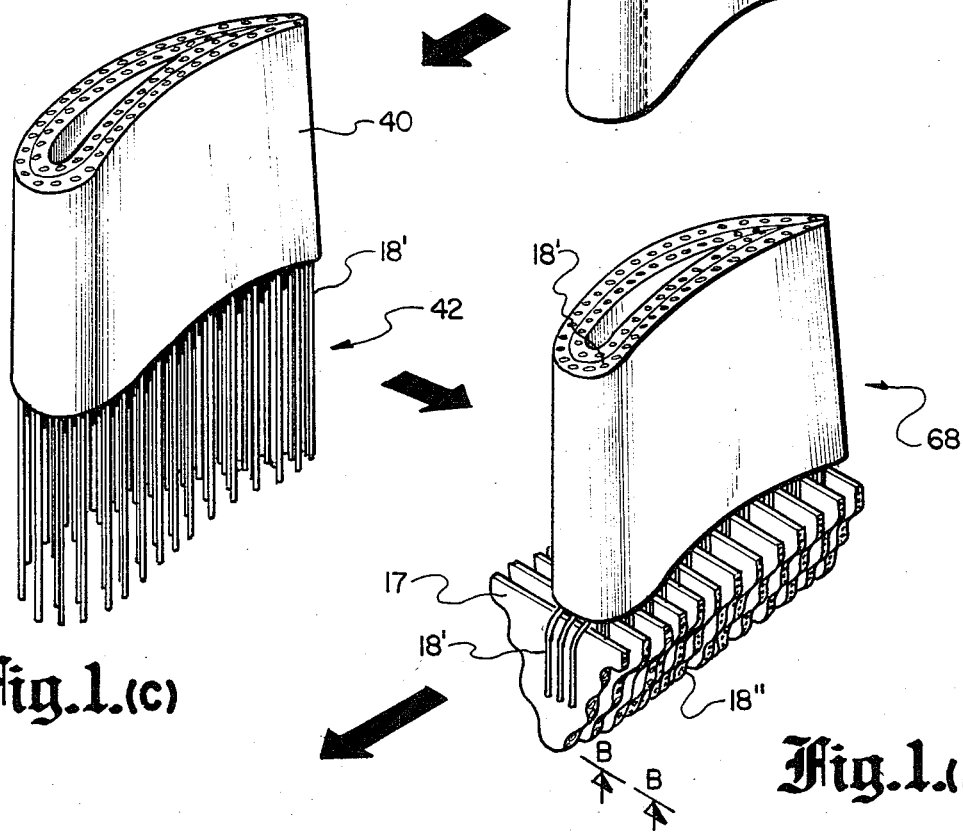
Fig.1.(C)
Fig.1.(D)

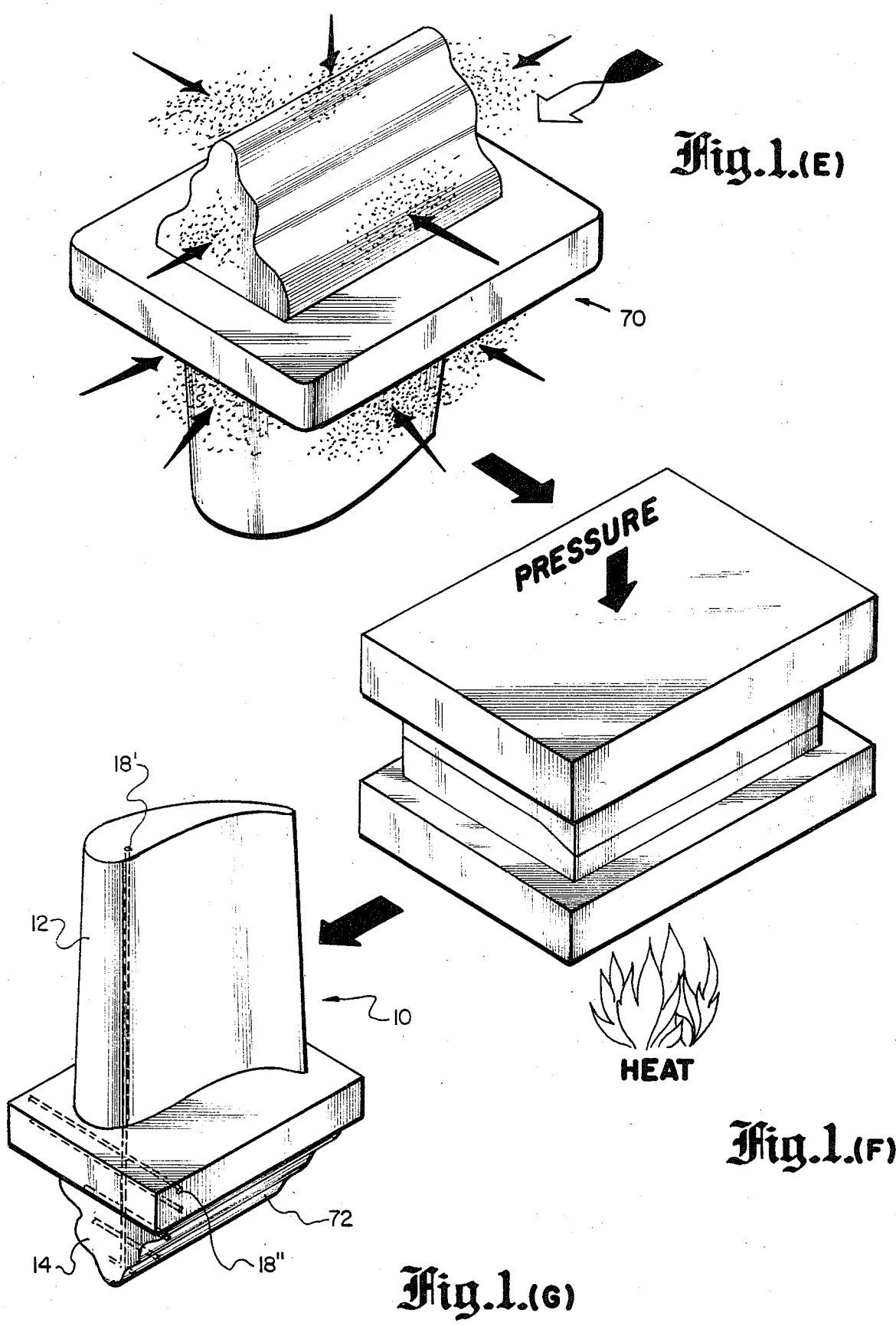

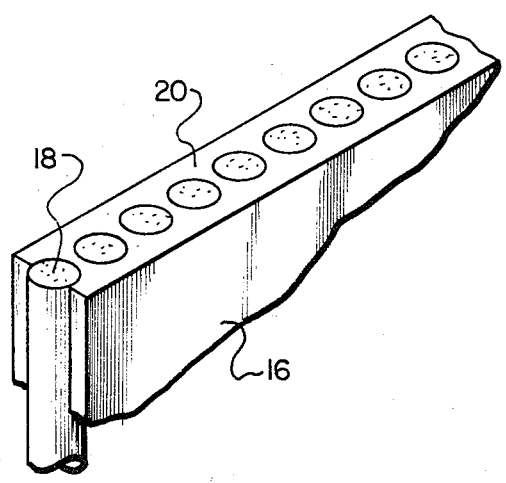
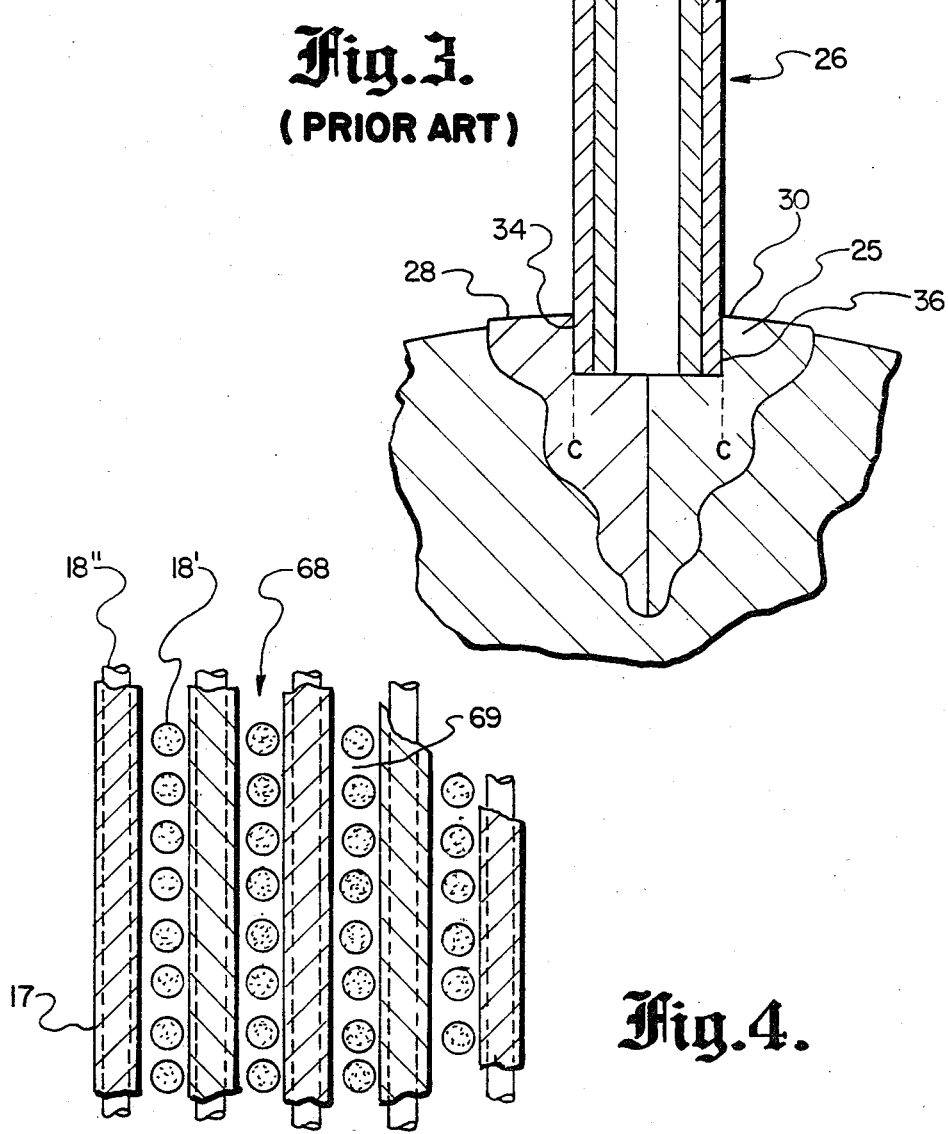
Fig.2.
Fig.3. (PRIOR ART)
Fig.4.

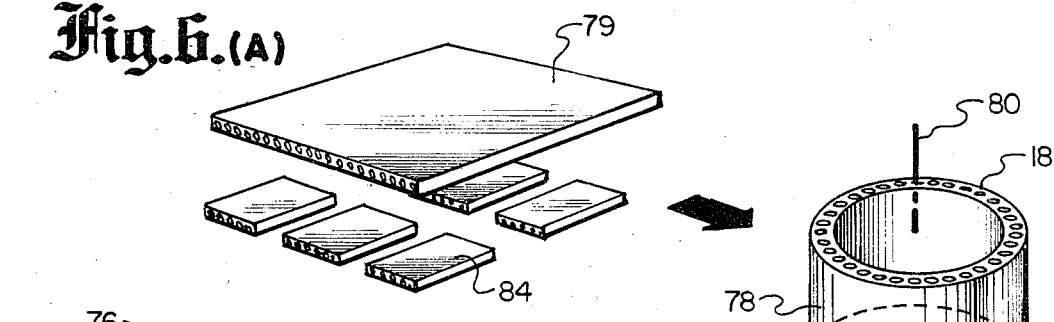
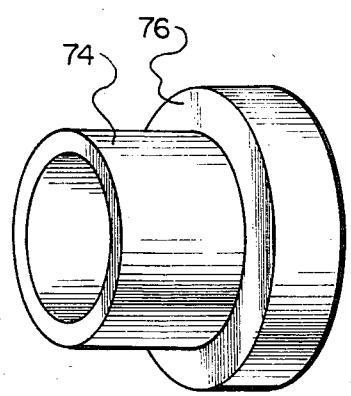
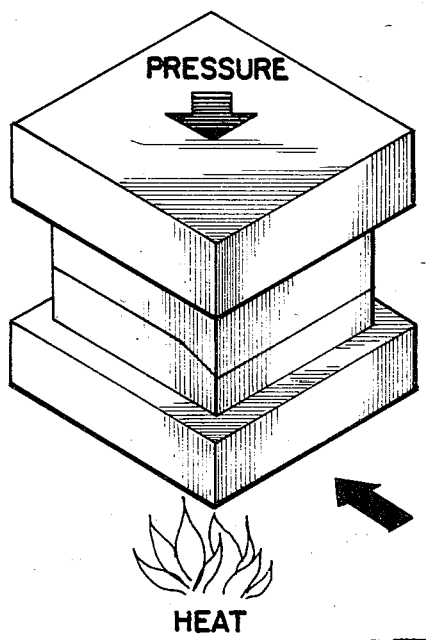
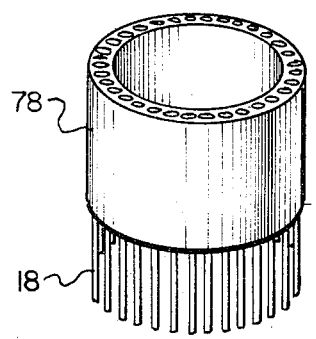
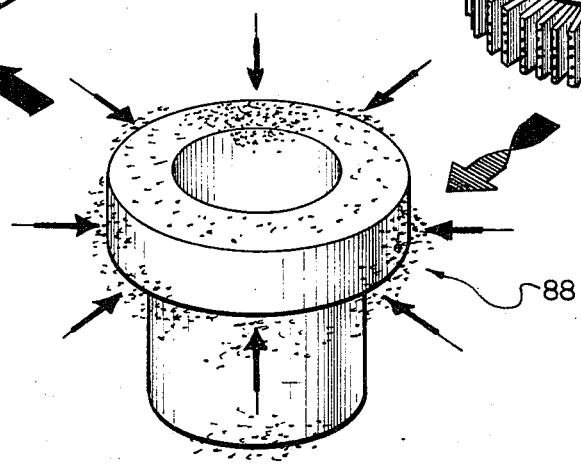

FIBER-COMPOSITE TURBINE BLADE AND METHOD FOR ITS CONSTRUCTION

BACKGROUND OF INVENTION

1. Field of the Invention

The present invention relates generally to a method of manufacturing complex structures from fiber-composite materials and more particularly to the construction of a fiber-composite turbine blade having an increased capacity to withstand centrifugally induced loads.

2. Description of the Prior Art

The key to extracting improved performance in advanced liquid propellant rocket engines lies in the development of improved turbopumps having components which withstand elevated operating temperatures. Substantial interest has thus arisen in the development of materials and construction techniques for turbine blades, vanes and other components which can withstand these elevated conditions.

Tungsten fiber reinforced superalloys (TFRS) are the first of a family of high temperature composites that offer potential for significantly raising the allowable operating temperature of turbine components and they generally comprise plies of spaced apart, parallel tungsten alloy fibers set within superalloy matrix material. TFRS composites are potentially useful as turbine blade materials because they have many desireable properties such as good stress-rupture and creep resistance, oxidation resistance, ductility and microstructural stability. TFRS composites are usually formed into monotape plies which are bonded together to form the desired component.

Although TFRS composites provide all these advantages, substantial problems do arise when it is desired to construct a component having integrally formed transverse members such as a cylinder with a rim, a vane with a shroud or a blade with a footing. Generally, the past practice for forming such structures with TFRS composites has been to form the members separately and then bonding the elements together along an interface. This construction however weakens the final structure against shears acting along the plane of the bond interface.

For instance, the practice for constructing TRFS turbine blades has generally comprised the steps of forming the aerofoil portion of the blade from a lamination of die cut plies of TRFS monotape. The footing of the blade is then formed by bonding separate pieces of material to the outer and inner sides of the root section of the blade. This scheme for attaching the footing, however, is a weak link in the overall structure because rotation of the turbine disk subjects the interface between the root of the aerofoil and the footing to a large and very concentrated shearing-load, particularly in the more advanced turbopump designs wherein shaft speeds can be 40,000 to 90,000 revolutions per minute. These speeds, along with the elevated temperatures and weight of the TRFS material, cause the risk of a shear-mode failure in this type of blade to be undesirably high.

OBJECTS OF THE INVENTION

It is therefore an object of the present invention to provide a turbine blade constructed from TRFS and a method of constructing same having an aerofoil section and a footing integrally formed therewith, which blade can withstand the centrifugal loading at and about the blade root even at the higher temperatures and speeds of the most advanced turbomachinery.

It is yet another object of the present invention to provide a TFRS composite turbine blade with an integrally formed footing, which construction enhanches the ability of the turbine blade to withstand centrifugally induced loads, particularly at and about the blade root.

It is still another object of the present invention to provide a method for constructing complex structures out of TFRS material comprising transversely disposed, integrally formed members, which method enhances the ability of the structure to withstand shearing-loads acting along the general axis of one of the members.

It is still another object of the present invention to make the use of TFRS composite materials in turbine components a reality and thus improve the performance potential of turbine systems incorporating such components.

SUMMARY OF THE INVENTION

These and other objects are achieved by the present invention which provides a method for constructing from fiber-composite material complex structures having two or more transversely disposed members. By way of example, a composite turbine blade having an aerofoil and an integrally formed footing can be constructed using this new method, which method comprises the steps of forming from fiber-composite monotape a blank in the general shape of the aerofoil with the fibers of the monotape being oriented in a generally spanwise direction, exposing the fibers at the root of the aerofoil blank, inserting transversely between the exposed fibers a plurality of foot-forming monotapes to form a transversely meshed, tape and fiber structure, filling the voids in the transversely meshed structure with powdered matrix material and hot pressing the filled-in structure substantially according to the desired final shape of the fiber-composite turbine blade.

The transverse intermeshing and bonding of the fibers of the aerofoil and the tapes of the footing interlocks the two elements and consequently increases the area over which centrifugally-induced loads in the blade are carried. In this fashion, the present invention avoids the concentration of shear loads at and about the interface between the aerofoil root and footing and makes it possible for the blade to remain structurally viable even at extreme temperatures and rotational speeds.

Other objects, advantages and novel features of the present invention will become apparent from the following detailed description of the invention when considered in conjunction with the accompanying drawing.

BRIEF DESCRIPTION OF THE DRAWINGS

FIGS. 1(a)–(g) is a sequential diagram representing the steps comprising the method of forming a turbine blade in accordance with the preferred method of the present invention. FIG. 1(g) also shows a turbine blade constructed according to the method of the present invention.

FIG. 2 is a greatly enlarged perspective view taken at section A of FIG. 1(a) showing the structure of the fiber-composite material.

FIG. 3 is a cross-sectional view of a turbine blade constructed according to the practice of the prior art as taken across the cord of the blade.

FIG. 4 is an enlarged detailed view of the transversely meshed tape and fiber structure shown in FIG. 1(d) as viewed from B—B.

FIG. 6(a)-(g) is a sequential diagram representing the steps for constructing a rimmed cylinder in accordance with the method of the present invention.

The same elements or parts throughout the figures of the drawing are designated by the same reference characters, while equivalent elements bear a prime designation.

DETAILED DESCRIPTION OF THE PREFERRED EMBODIMENT

Figure 5:
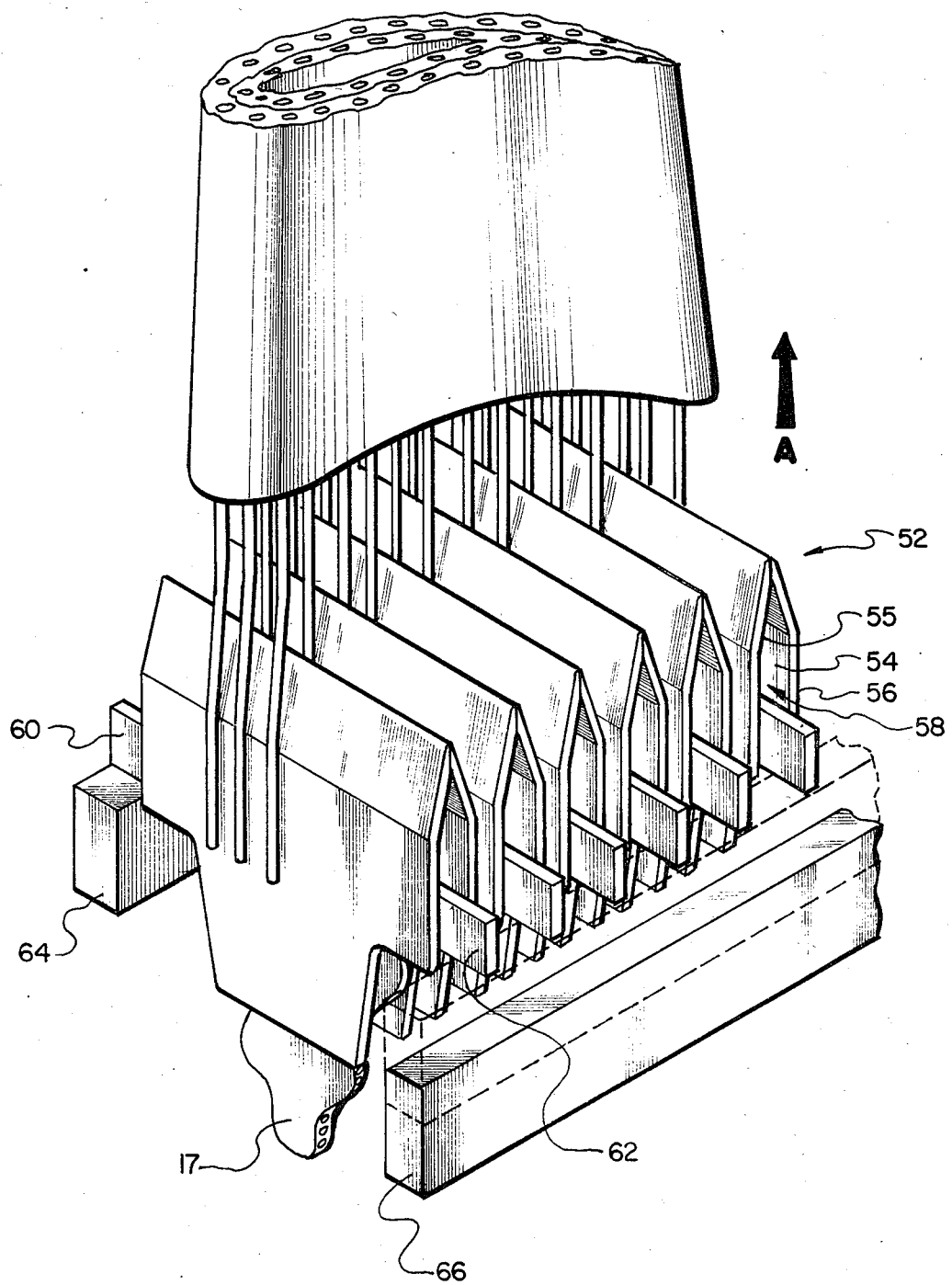
FIG. 5 is a perspective view illustrating the use of a holder-comb and rakes in the practice of the present invention.

Referring to FIG. 1(g), the present invention provides a method for constructing from fiber-composite material complex structures having integrally formed, transversely disposed members. By way of a preferred application, the new method can be used to construct from fiber-composite material a turbine blade 10 having an aerofoil 12 and an integrally formed footing 14. It is to be understood, however, that the method herein described has broad application to a wide variety of structures to be constructed from fiber reinforced composite materials and is particularly advantageous in those which are to feature integrally formed transverse members.

The fiber-composite material referenced above preferably takes the form of TFRS monotape 16 illustrated in magnified form in FIG. 2 wherein a row of reinforcing tungsten alloy fibers 18 are wholly contained within superalloy matrix material 20 in a parallel, spaced apart relationship to one another. When constructing turbine blade 10, matrix material 20 preferably comprises a highly ductile iron base superalloy such as FeCrAlY alloy, but can also comprise ductile stainless steel or nickel base superalloys such as Waspalloy. Refractory alloys such as tantalum, molybdenum or niobium alloys can also be used in fibers 18 instead of tungsten. A detailed list of possible materials to be used in plies 16 for turbine components can be found in Tables I-III of NASA TECHNIAL MEMORANDUM 82590, incorporated herein by reference. Of course, other materials such as boron, silicon carbide or various forms of graphite might be used in fibers 18 when one is constructing objects other than turbine blades.

Referring to FIG. 3, the prior art practice for constructing a blade from fiber-composite material resorted to forming a footing 25 of turbine blade 26 by bonding pieces 28 and 30 to sides 34 and 36 of the aerofoil shank 38. Thus, during turbine spin, aerofoil shank 38 would tend to be sheared from pieces 28 and 30 as a result of centrifugally induced loads along planes C.

Referring to FIG. 1(a), the method for constructing turbine 10 according to the present invention begins with the provision of fiber-composite aerofoil plies 15 for forming aerofoil blank 40 and foot-forming fiber-composite plies 17 for forming footing 14 of turbine blade 10. It is to be understood that aerofoil plies 15 and foot-forming plies 17 are preferably constructed from TFRS monotape 16 and that the number of items shown in FIG. 1(a) is less than those which would be actually used in most applications. Referring to FIG. 1(b), aerofoil blank 40 is formed with a root section 42 with which footing 14 will be integrally attached. The step of forming aerofoil blank 40 is preferably accomplished by laying up one or more fiber-composite plies 15 about a leachable forming mandrel (not shown), so that their fibers 18' run in a generally span-wise direction. The layers of fiber-composite plies 15 are diffusion bonded together and then the forming mandrel is chemically leached out of aerofoil blank 40. Other methods for forming aerofoil blank 40 would serve to equal advantage, such as the method used in U.S. Pat. No. 3,942,231—CONTOUR FORMED METAL MATRIX BLADE PLIES wherein precontoured fiber-composite plies are stacked and bonded together to form an aerofoil blank. The blank-forming step of the present invention would depart from the method taught in the referenced patent in that no footing pieces as shown in the patent would be bonded to the sides of the aerofoil blank.

After the formation of aerofoil blank 40, matrix material 20' in the region of root section 42 of aerofoil blank 40 is chemically stripped to expose fibers 18'. Mechanical stripping or other techniques can be used for exposing fibers 18' as desired.

The next step of the method is the insertion of the foot-forming pieces 17 between exposed fibers 18' in a transversely intermeshing manner as shown in FIG. 1(d). Foot-forming plies 17 are preferably formed so that their fibers 18'' therein will be oriented transversely with respect to the direction of exposed fibers 18' of aerofoil blank 40. Although filaments 18' and 18'' are shown in FIG. 1(d) to be at right angles to one another, it might prove desirable in certain applications to construct and orient foot-forming plies 17 so that their fibers 18'' cross fibers 18' of aerofoil blank 40 at other angles.

In order to assist in the insertion of foot-forming plies 17, a holder-comb 52 shown in FIG. 5 is provided which has teeth 54 comprising opposing, flexible leaves 55 and 56 which cooperate to form a pocket 58 for receiving individual foot-forming plies 17 in a manner allowing ends 60 and 62 of each ply 17 to extend beyond pocket 58. Leaves 55 and 56 of each tooth 54 open to allow the extraction of the foot-forming plies 17 from holder-comb 52. In use, foot-forming plies 17 are placed in pockets 58 in proper arrangement and orientation and then holder-comb 52 is raised in the direction indicated by arrow A in FIG. 5, whereupon leaves 55 and 56, being in their closed position, part exposed fibers 18' of aerofoil blank 40 and thus allow the prepositioning of foot-forming plies 17 between adjacent exposed fibers 18'. Referring to FIG. 5, rakes 64 and 66 are then raised to engage ends 60 and 62 of foot forming plies 17 to keep plies 17 in place as holder comb 52 is lowered to extract same. As holder-comb 52 drops, leaves 55 and 56 of teeth 54 open to release plies 17.

Referring now to FIGS. 1(d) and 4, the insertion of foot-forming plies 17 between exposed filaments 18' results in the formation of a transversely meshed, tape and fiber structure 68 providing open-faced voids 69 including those between adjacent foot-forming plies 17 and fibers 18'. In the next step of the present invention, these voids and others are filled with powdered matrix material using packing techniques well known to the art. The resultant filled structure 70 shown in FIG. 1(e) is then hot pressed to its final form as represented in FIG. 1(g). It is to be understood that turbine blade 10 might require further finishing such as on the exterior surface 72 of footing 14. The hot pressing step here is preferably the known technique of placing an article within a die and subjecting it to compaction and heat to arrive at temperatures which promote diffusion bonding within the article.

Because of this method turbine blade 10 possesses a new and unique internal structure wherein the spanwise running fibers 18' of aerofoil 12 of turbine blade 10 are intermeshed transversely with fibers 18" forming footing 14. Thus, when turbine blade 10 is attached to a rotating disk, centrifugally induced loads at and about the connection between the footing 14 and aerofoil 12 are widely distributed and are resisted by a more self-reinforcing structure than that of the prior art structure shown in FIG. 3.

Although FIG. 1(a) depicts foot-forming plies 17 as having a shape closely matching the final shape of foot 14 of turbine blade 10, it is to be realized that foot-forming plies 17 could be formed as mere rectangular plies which could be machined into the final footing surface 17.

Instead of first forming aerofoil blank 40 and then exposing fibers 18', the same result can be achieved by exposing the respective portions of fibers 18' of fiber composite plies 15 prior to the formation of aerofoil blank 40.

For illustrating the broad applicability of the method herein disclosed, FIGS. 6(a)–(g) provide a sequential representation of the steps for the construction from fiber-composite material of a cylinder 74 having an integrally formed flange 76 according to the same method as used for constructing turbine blade 10. First, a blank 78 of cylinder 74 is formed from fiber-composite plies 79 (FIG. 4(b)), with the fibers 18 of the fiber-composite material being oriented in the general direction of axis 80 of blank 78, whereupon fibers 18 are exposed in the region 82 where flange 76 is to be integrally formed with the cylinder 74. Then flange-forming fiber-composite tape plies 84 are inserted between exposed fibers 18 to form a transversely meshed tape and fiber structure 86. It is to be noted that each flange-forming piece 84, as inserted, is both transverse to and radially extending from cylinder blank 78. The voids within the resultant structure 86 are then filled with powdered matrix material (FIG. 4(e)) to form filled structure 88, which is then hot pressed (FIG. 4(f)) to form the desired cylinder 74 and flange 76. It is to be noted that the final product is very structurally resistive of forces which would otherwise tend to shear and bend flange 76 from cylinder 74. It is to be also realized that cylinder 74 of the final product could be further reinforced for purposes of hoop compression by laminating cylinder 74 with another layer of fiber-composite plies 16 aligned such that its fibers 18 run circumferentially about cylinder 74.

Obviously, many modifications and variations of the present invention are possible in light of the above teachings. For example, fiber-composite plies 16 could be constructed from materials other than those specifically mentioned herein and footing 14 of turbine blade 10 could be given a different shape. It is therefore to be understood that, within the scope of the appended claims, the invention may be practiced otherwise than as specifically described.

What is claimed and desired to be secured by Letters Patent of the United States is:

1. A method of manufacturing a fiber-composite turbine blade comprising an aerofoil and an integrally formed footing, said method comprising the steps of:
    forming a blank in the general shape of said aerofoil with fiber-composite material, the fibers of said fiber-composite material being oriented in a substantially spanwise direction along said aerofoil blank, said aerofoil blank having a root;
    exposing said fibers at said root;
    forming a footing comprising a transversely meshed tape and fiber structure by transversely inserting a plurality of foot-forming fiber-composite tapes between said exposed fibers at said root;
    filling voids in said transversely meshed tape and fiber structure with filler matrix material; and
    compacting and bonding said filled structure to form said fiber-composite turbine blade.

2. The method as claimed in claim 1 wherein said method further comprises the step of machining the exterior of said footing to a final shape.

3. The method as claimed in claim 1 wherein said inserting step is accomplished with a comb for parting said exposed fibers.

4. The method as claimed in claim 1 wherein said exposing step is accomplished by exposing fibers of said fiber-composite material prior to the step of forming said blank.

5. The fiber-composite turbine blade as claimed in claim 4 wherein said fiber-composite material comprises tungsten fiber-reinforced superalloy.

6. A turbine blade manufactured according to the method as claimed in claim 4.

7. A fiber-composite turbine blade manufactured according to the method as claimed in claim 1.

8. A method of manufacturing a complex fiber-composite structure comprising a first member and an integrally formed transverse member, said transverse member being transverse to an axis of said first member, said method comprising the steps of:
    forming a blank in the general shape of said first member with fiber-composite material, the fibers of said blank-forming fiber-composite material being oriented in the general direction of said axis;
    exposing said fibers of said blank along a portion of said blank whereat said secondary member is to be integrally formed;
    forming a transversely meshed tape and fiber structure by transversely inserting a plurality of transverse-member-forming fiber-composite tapes between said exposed fibers;
    filling voids in said transversely meshed tape and fiber structure with filler matrix material; and
    compacting and bonding said filled structure substantially to the desired shape of said complex fiber-composite structure.

9. The method as claimed in claim 8 wherein said exposing step is accomplished by exposing fibers of said blank-forming fiber-composite material prior to the step of forming said blank.

* * * * *